(12) United States Patent
Dina et al.

(10) Patent No.: US 7,855,849 B2
(45) Date of Patent: Dec. 21, 2010

(54) METHODS AND APPARATUS FOR TEMPERATURE COMPENSATION FOR HARD DISK DRIVE WRITE OVERSHOOT CURRENT

(75) Inventors: Marius Vicentiu Dina, Burnsville, MN (US); Jeremy Robert Kuehlwein, Woodbury, MN (US)

(73) Assignee: Texas Instruments Incorporated, Dallas, TX (US)

( * ) Notice: Subject to any disclaimer, the term of this patent is extended or adjusted under 35 U.S.C. 154(b) by 300 days.

(21) Appl. No.: 12/016,026

(22) Filed: Jan. 17, 2008

(65) Prior Publication Data

US 2008/0239563 A1   Oct. 2, 2008

Related U.S. Application Data

(60) Provisional application No. 60/921,205, filed on Mar. 30, 2007.

(51) Int. Cl.
*G11B 5/02* (2006.01)

(52) U.S. Cl. .............................. 360/67; 360/31; 360/46; 360/97.02

(58) Field of Classification Search ...................... None
See application file for complete search history.

(56) References Cited

U.S. PATENT DOCUMENTS

| | | | |
|---|---|---|---|
| 5,886,564 A * | 3/1999 | Sato et al. .................... 327/513 |
| 6,175,463 B1 | 1/2001 | Nayebi |
| 6,496,317 B2 * | 12/2002 | Lacombe ..................... 360/68 |
| 6,549,353 B1 * | 4/2003 | Teterud ....................... 360/46 |
| 6,914,738 B2 * | 7/2005 | Fujiwara et al. ............... 360/68 |
| 7,095,576 B2 | 8/2006 | Kim |
| 7,154,687 B2 | 12/2006 | Ikekame |

* cited by examiner

*Primary Examiner*—Jason C Olson
(74) *Attorney, Agent, or Firm*—Dawn V. Stephens; Wade James Brady, III; Frederick J. Telecky, Jr.

(57) ABSTRACT

Methods and apparatus for temperature compensation for hard disk drive writer overshoot current are disclosed. A disclosed system comprises creating a first delay based on the temperature of the hard disk drive, creating a second delay based on the temperature of the hard disk drive, and creating a pulse based on the first and second delay.

25 Claims, 7 Drawing Sheets

METHODS AND APPARATUS FOR TEMPERATURE COMPENSATION FOR HARD DISK DRIVE WRITE OVERSHOOT CURRENT

CROSS REFERENCE TO RELATED APPLICATIONS

This patent claims the benefit of United States Provisional Patent Application bearing Ser. No. 60/921,205, filed on Mar. 30, 2007. The foregoing United States Provisional Patent Application is hereby incorporated by reference in its entirety.

TECHNICAL FIELD

The present disclosure pertains to hard disk drives and, more particularly, to methods and apparatus for temperature compensation for hard disk drive writer overshoot current.

BACKGROUND

A hard drive is a non-volatile storage device that stores digitally encoded data on rotating platters with an associated magnetic surface. As shown in FIG. 1, a hard drive 100 includes a spindle 101 that holds at least one platter 102 having a magnetic surface 104, which spins at a constant speed (e.g., 10,000 revolutions per minute (rpm), 7,200 rpm, or 5,400 rpm). To write data onto a rotating platter, a portion of the magnetic surface 104 is magnetized via a magnetic write head 106. The write head 106 is coupled with an actuator arm 108 that moves radially across the spinning platters 102. To create a current pulse to control the write operation, a differential hard drive write system 110 including a hard drive controller 112 is coupled to the write head 106. The hard drive controller 112 is configured to control the read and/or write operations via a hard drive write system 110.

To increase hard drive write speed and capacity, the hard drive write system 110 generates narrow current pulses via a differential control pulse to write information to the magnetic surface 104. However, as the duration of the current pulse decreases to accommodate increased hard drive speed and storage capacity, the current pulse becomes distorted during transmission to the write head 106. To correct the distorted edge of the current pulse, the hard drive write system 110 produces current pulses with an overshoot portion to prevent distortion to the leading edge of the current pulse. The overshoot portion is followed by a sustain portion to write information to the platter for the full duration of the write operation.

As appreciated by a person with ordinary skill in art, the hard drive operation results in a significant amount of heat. Generally, hard drives may achieve temperatures of up to 130° C. The increased temperature of the hard drive affects performance of the devices in the write driver system 110. Temperature in the hard drive 100 affects performance of devices and causes the parasitics and parameters of the devices to vary either in a linear or non-linear fashion. For example, resistors and stray, parasitic resistances vary over temperature.

Another example of how device performance varies is an NPN transistor, which experiences reduced switching speed due to increased temperature. In other words, as temperature increases, switching time between transistors increases and results in slower transmission of the overshoot current pulse between devices. As illustrated in FIG. 1B, the overshoot current pulse 120 has a sharp leading edge 122 and delayed switching time between transistors results the loss and degradation of the leading edge 122. The solid line illustrated in FIG. 1B shows the ideal current pulse, but the dashed line shows how the current pulse degrades with temperature. Consequently, the amplitude and the duration of the overshoot current pulse is reduced in the write drive system.

DETAILED DESCRIPTION

I. System Overview

Figure 1A:
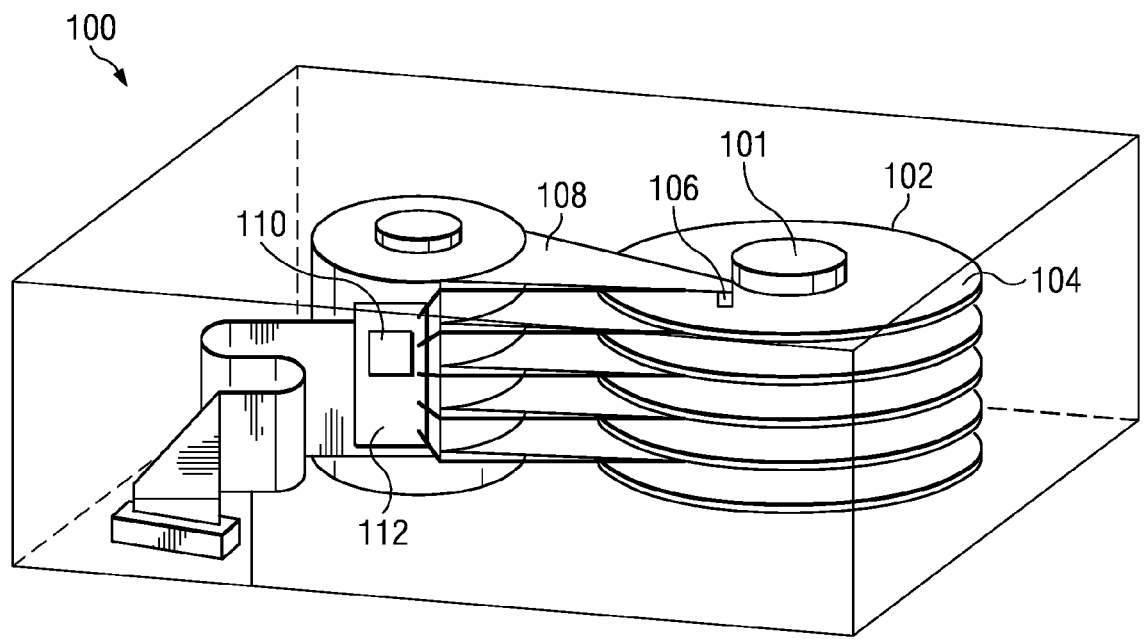
FIG. 1A is an illustration of a known hard drive system.
Figure 1B:
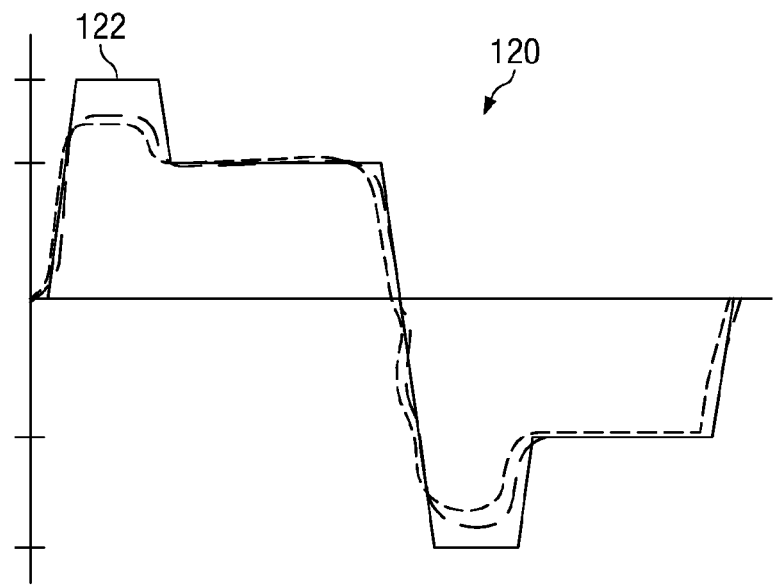
FIG. 1B is an illustration of the degradation of the current pulse due to temperature.
Figure 2:
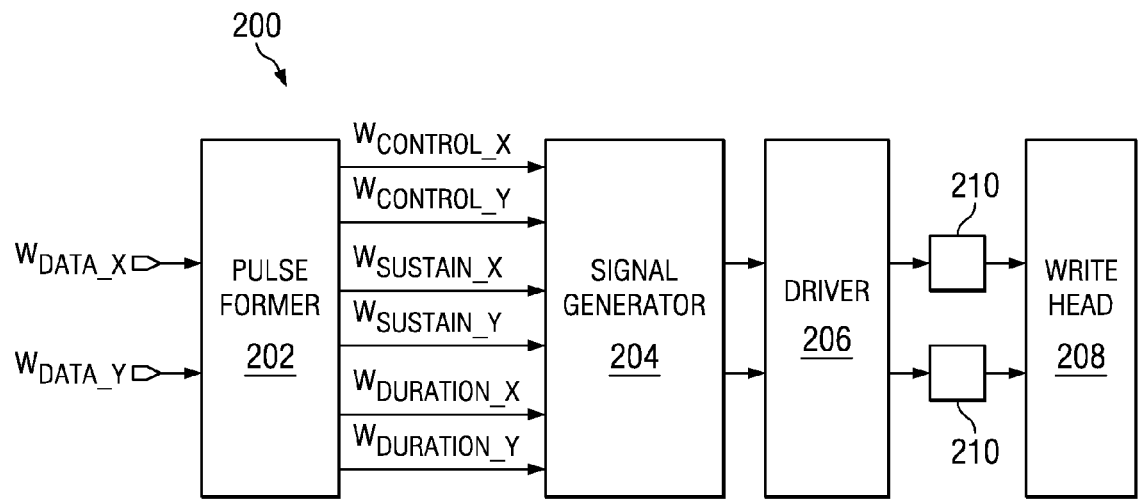
FIG. 2 is block diagram of an example hard drive write system of FIG. 1.

FIG. 2 illustrates an example architecture of a hard drive write system 200, which may be used to implement an improved version of the hard drive write system 110 of FIG. 1A. Generally, the hard drive write system 200 includes a pulse former 202, a signal generator 204, and a driver 206. The driver 206 is coupled to one or more of the write heads 208 via a transmission line 210. The hard drive write system 200 is a differential system that receives a differential write data ($W_{DATA\_X}$ and $W_{DATA\_Y}$), which represents the data to be stored on the disk. A person having ordinary skill in the art will readily appreciate that the write data ($W_{DATA\_X}$ and $W_{DATA\_Y}$) is complementary such that $W_{DATA\_Y}$ is 180 degrees out of phase with $W_{DATA\_X}$. Accordingly, a person having ordinary skill in the art will understand that for each complementary pair, there is a complementary circuit that operates identically but with a different input, a different output, and additionally, 180 degrees out of phase.

In the example hard drive write system 200, the pulse former 202 receives differential write data ($W_{DATA\_X}$ and $W_{DATA\_Y}$) in order to generate pulses to control the signal generator 204. In one particular example, the pulse former 202 forms three pairs of differential signals: a write control signal ($W_{CONTROL\_X}$ and $W_{CONTROL\_Y}$), a write sustain control signal ($W_{SUSTAIN\_X}$ and $W_{SUSTAIN\_Y}$), and a write duration control signal ($W_{DURATION\_X}$ and $W_{DURATION\_Y}$). The signal generator 204 receives the three pairs of differential control signals generated by the pulse former device 202 and, as explained below, using the three control signals, generates a consolidated current pulse with an overshoot portion and sustain portion. The overshoot portion has a current amplitude substantially equal to a predetermined overshoot value and the sustain portion has a current amplitude that is a portion of the overshoot.

The signal generator 204 conveys the consolidated current pulse to the driver 206. A person having ordinary skill in the art will appreciate that the driver 206 conditions the current pulse to be conveyed to the write head 208. The driver 206 then transmits the current pulse to the write head 208 via the transmission line 210 for the purpose of writing the write data ($W_{DATA\_X}$ and $W_{DATA\_Y}$) to the magnetic surface 104 of the platter 102.

II. Example Pulse Former Device

Figure 3:
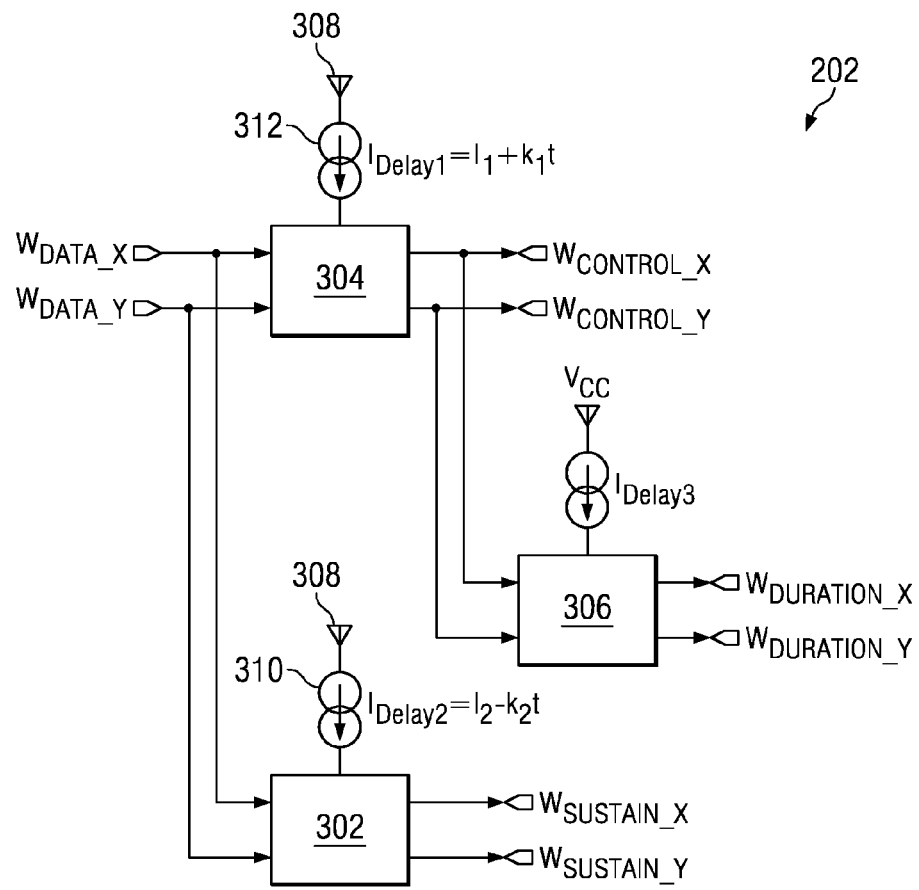
FIG. 3 is block diagram showing additional detail of the pulse former of FIG. 2.

FIG. 3 illustrates an example pulse former device 202 that generates the differential control signals used by the signal generator 204 in order to generate the consolidated current pulse. For the purpose of forming two control signals, the example pulse former 202 includes delays 302 and 304. A third delay 306 is further included to generate a third control signal that will be described in detail below. Delays 302 and 304 both receive differential write data ($W_{DATA\_X}$ and $W_{DATA\_Y}$). However, delay 302 forms a write sustain signal ($W_{SUSTAIN\_X}$ and $W_{SUSTAIN\_Y}$) and delay 304 forms a write control signal ($W_{CONTROL\_X}$ and $W_{CONTROL\_Y}$), both of which are described in detail below in conjunction with the signal generator 204. The delay 306 receives the write control signal ($W_{CONTROL\_X}$ and $W_{CONTROL\_Y}$) and forms a write duration control signal ($W_{DURATION\_X}$ and $W_{DURATION\_Y}$).

In the example of FIG. 3, the current applied to delays 302, 304, and 306 modifies the time delay between receiving an input and forming a signal. That is, because the current sources 310 and 312 alter the current based on temperature, the delays alter the time delay based on temperature. A person having ordinary skill in the art will readily appreciate that the delays are inversely proportional to the current (i.e., as current increases, the time delay decreases or switching speed increases).

As previously noted, increased temperature causes signals to propagate slower in the hard drive write system 200, which causes the current pulse to become distorted before the current pulse is used to write data to the hard disk via the write head 208. For the purpose of making a linear delay between 0° C. and 130° C. as a function of temperature, the delays 302, 304 are powered by a power supply 308 via current sources 310 and 312, respectively. To selectively alter the current in response to temperature changes and thereby affect delays, the current sources 310 and 312 each have a base current that is modified by an associated temperature coefficient. In the example of FIG. 3, current source 310 has a negative temperature coefficient (NTC) and current source 312 has a positive temperature coefficient (PTC). The temperature coefficients of the two current sources are inversely related (e.g., the temperature coefficients are $-k_1$ and $+k_2$). In other words, the negative temperature coefficient of current source 310 decreases the current provided to the delay 302 as temperature of the hard drive write system 200 increases. Conversely, the positive temperature coefficient of current source 312 increases the current provided to the delay 304 as temperature of the hard drive write system 200 increases. These current changes affect the switching speeds of the delays 302 and 304. The current sources 310, 312 alter the current in a linear fashion over broad temperature ranges.

Figure 4A:
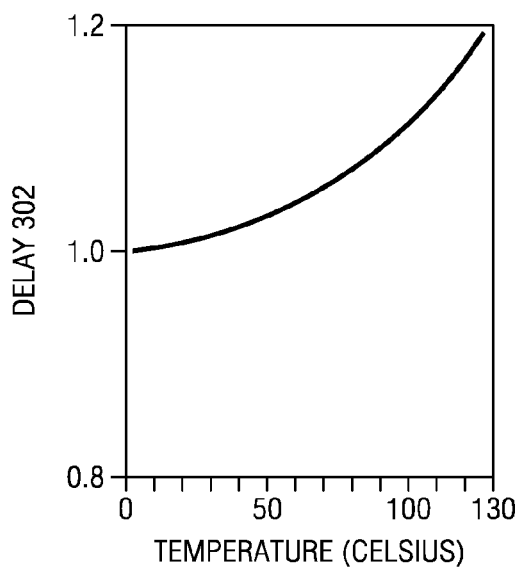
FIGS. 4A-C are diagrams illustrating the timing delays of FIG. 3.
Figure 4B:
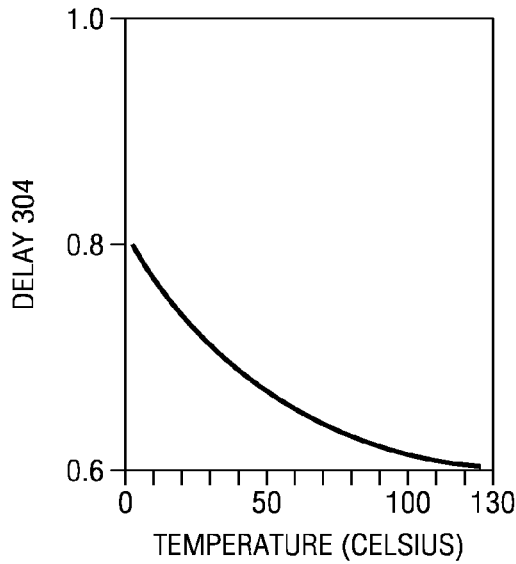
Figure 4C:
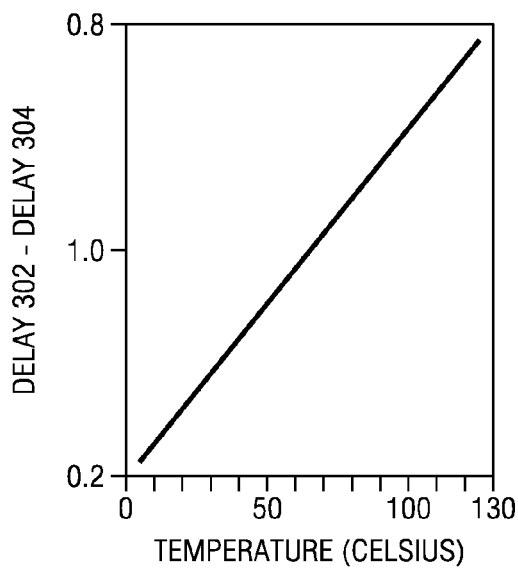

FIGS. 4A and 4B illustrate the time delays associated with delays 302 and 304 as the hard drive write system 200 varies between temperatures of 0° C. and 130° C. In FIG. 4A, as temperature increases, the current source 310 decreases the current provided to delay 302. As described above, decreased current causes the delay 302 to increase the time delay of the associated output ($W_{SUSTAIN\_X}$ and $W_{SUSTAIN\_Y}$). Conversely, in FIG. 4B, as temperature increases, the current source 312 increases the current provided to delay 304. As described above, increased current causes delay 304 to decrease the time delay of the associated output ($W_{CONTROL\_X}$ and $W_{CONTROL\_Y}$). FIG. 4C illustrates the difference between delay 302 and delay 304, which is substantially linear between 0° C. and 130° C. The signal generator 204, using the control signals (e.g., $W_{CONTROL\_X}$ and $W_{SUSTAIN\_X}$) provided via delays 302 and 304, creates a current pulse with an overshoot portion in which the duration of the overshoot portion of the pulse is a linear function of temperature before the pulse is conveyed to the write head 208 (i.e., the overshoot duration is equal to a baseline duration that increases linearly with respect to temperature). However, because loss in the hard drive increases as a function of temperature, the duration of the overshoot portion may be constant or substantially constant when the pulse is received by the write head 208.

Delay 306 operates in substantially the same manner as delay 302 and 304. However, delay 302 receives the output of delay 304 as input for the purpose of providing a third timing control, which is described in detail below. The differential output of delay 306 is accordingly is a write duration control signal ($W_{DURATION\_X}$ and $W_{DURATION\_Y}$).

A. Operation of Example Pulse Former Device

Figure 5:
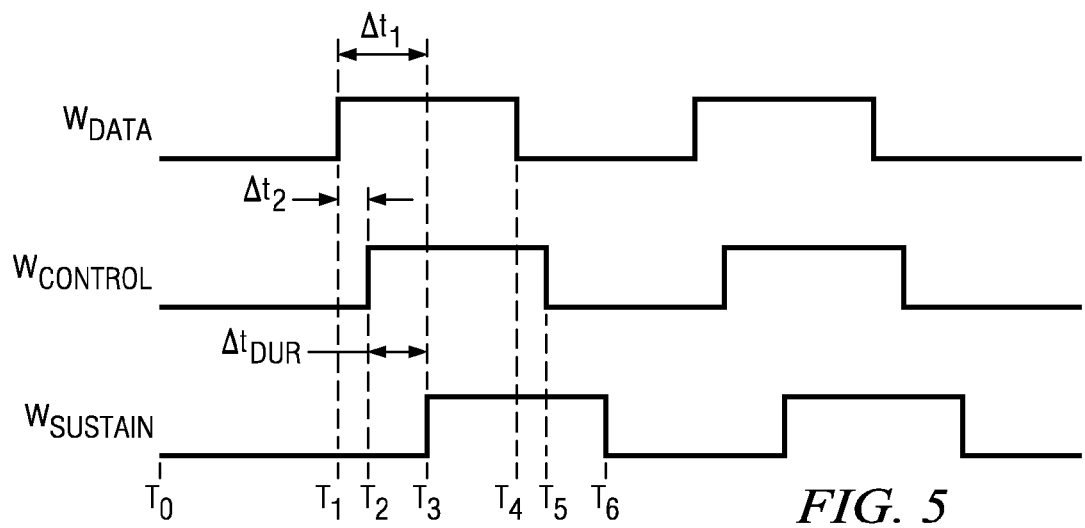
FIG. 5 is a diagram showing the example pulses formed by the pulse former of FIG. 3.

As shown in the example of FIG. 5, when an input signal (e.g., $W_{DATA\_X}$) is received by delay 302, delay 302 forms a delayed write sustain signal on the output (e.g., $W_{SUSTAIN\_X}$). A person having ordinary skill in the art will readily appreciate that FIG. 5 depicts only one half of the differential system and that the other half would be identical, albeit 180 degrees out of phase. As illustrated in FIG. 5, the time difference between receiving the input signal and forming the output control signal is $\Delta T_1$. As described above, the time delay of $\Delta T_1$ is inversely related to the current provided to delay 302 (i.e., as current decreases, the time delay increases). Because the current source 310 is associated with a negative temperature coefficient, current provided to delay 302 decreases as temperature increases. Thus, as illustrated in FIG. 4A, $\Delta T_1$ increases as temperature increases.

When input data is received by the delay 304, delay 304 creates a delayed write control signal on the output (e.g., $W_{CONTROL\_X}$). As illustrated in FIG. 5, the time difference between receiving the input signal and forming the output control signal is $\Delta T_2$. Because the current source 312 is associated with a positive temperature coefficient, current provided to delay 304 increases as temperature increases. As described above, the time delay of $\Delta T_2$ is inversely related to the current provided to delay 304 (i.e., as temperature increases, the time delay decreases). Thus, as illustrated in FIG. 4B, $\Delta T_2$ decreases as temperature increases.

At an initial temperature, the time delays $\Delta T_1$ and $\Delta T_2$ are set to a baseline delay (e.g., $I_1=n_1$, $I_2=n_2$) with a baseline time delay. However, as temperature increases, $\Delta T_1$ increases and $\Delta T_2$ decreases, thus the difference between $\Delta T_1$ and $\Delta T_2$ ($\Delta T_{DURATION}$) increases based on temperature of the hard drive write system 200. As readily appreciated those having ordinary skill in the art, the delays 302, 304, and 306 vary non-linearly as a function of current. As illustrated in FIGS. 4A and 4B, because the current sources 310 and 312 vary linearly with respect to temperature, the time delays associated with delays 302 and 304 are non-linear as a function of temperature. However, in one example, the respective amounts of which $\Delta T_1$ and $\Delta T_2$ change are inversely proportional to each other. Consequently, the time difference between $\Delta T_1$ and $\Delta T_2$, which is illustrated in FIG. 4C, is substantially linear as a function of temperature.

At an initial temperature, the time delay between the write control signal and the sustain control signal ($\Delta T_{DURATION}$) is a predetermined delay. As temperature increases, the delay window changes in two directions by decreasing the delay of the write control signal and increasing the delay of the write sustain signal. If the time delay was altered in one direction by adjusting, the resulting time delay would be non-linear because the delays are non-linear as a function of current. However, due to the time duration being altered in two directions, the non-linear portions of the time delays are substantially cancelled out, resulting in a time delay that is substantially linear as a function of temperature. As will be described below, the control signals cause the signal generator 204 to create the current pulse with an overshoot portion with a duration of $\Delta T_{DURATION}$. Thus, to prevent amplitude loss of the overshoot portion of the current pulse as a result of slower response time in the hard drive write system 200, the duration of the overshoot portion of the current pulse varies as a function temperature of the hard drive write system 200.

B. Description of Example Delay

Figure 6:
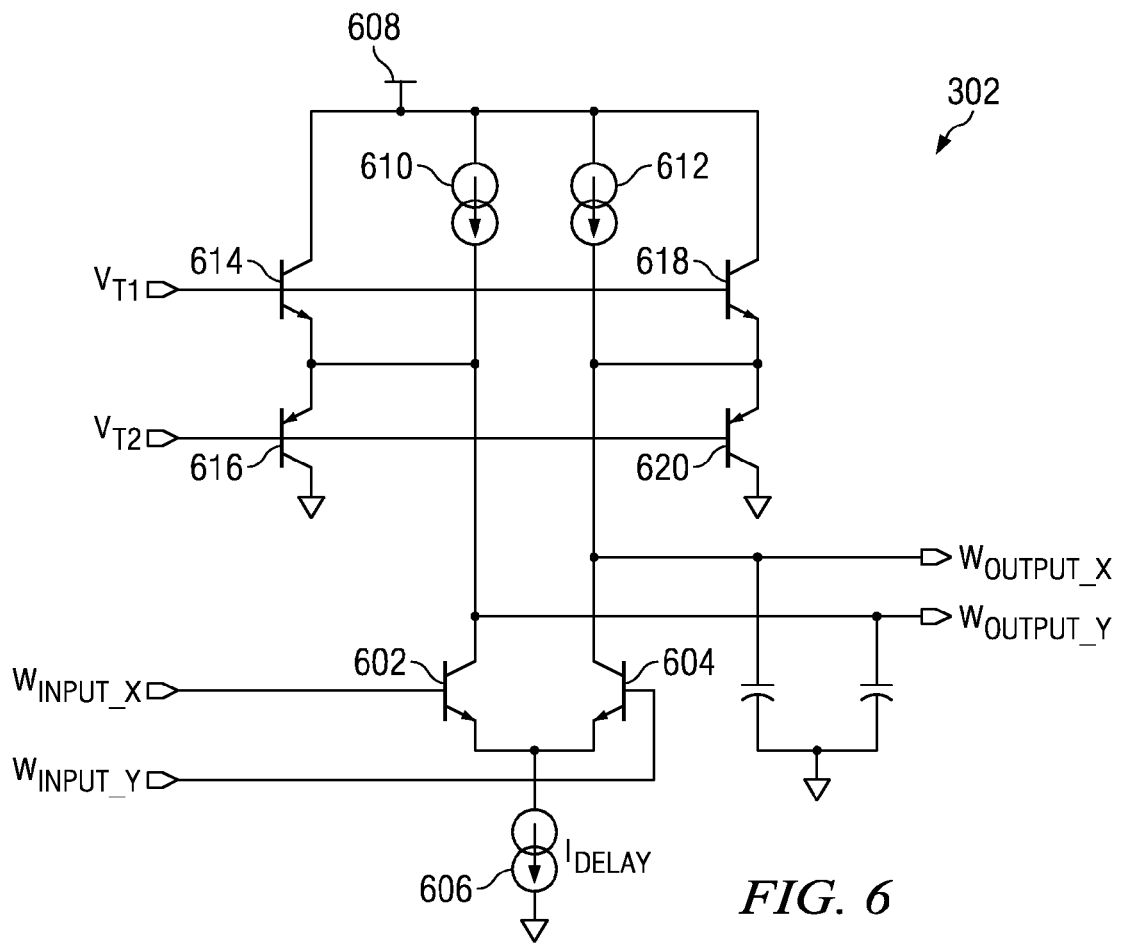
FIG. 6 is a schematic diagram showing additional detail of an example implementation of one of the delays of FIG. 3.

More detail of an example delay (e.g., one of the delays 302, 304, or 306) is illustrated in FIG. 6. However, a person having ordinary skill in the art will recognize the example of FIG. 6 is also representative of delays 304 and 306, except for the aspects noted. The delay 302 includes a differential pair of transistors, 602 and 604. The base of transistor 602 is coupled the input $W_{INPUT\_X}$ and the base of transistor 604 is coupled with the input $W_{INPUT\_Y}$. The inputs may be write data (e.g., $W_{DATA\_X}$) or control signals (e.g. $W_{CONTROL\_X}$) as illustrated in FIG. 3. The emitters of transistors 602 and 604 are coupled with a current sink 606, which is further coupled to a low output signal, such as a ground. The current sink 606 shunts an amount of current, $I_{DELAY}$, to the low output signal. $I_{DELAY}$ is equal to a baseline current adjusted via temperature coefficients, which may be positive or negative depending on the desired delay response to temperature. Thus, $I_{DELAY}$ may be equal to the following equations:

$$I_{DELAY} = I_1 - (k_1 \times t)$$

$$I_{DELAY} = I_2 + (k_2 \times t)$$

where $I_1$ and $I_2$ are baseline currents, $k_1$ and $k_2$ are temperature coefficients, and t is temperature in Celsius.

The collector of transistor 602 is coupled to a voltage source 608 via a current source 610. The collector of transistor 604 is coupled to a voltage source 608 via a current source 612. The current sources 610 and 612 source currents substantially equal to half of the current sink 606, $I_{DELAY}$. The output $W_{OUTPUT\_X}$ is coupled to the collector of transistor 602 and the output $W_{OUTPUT\_Y}$ is coupled to the collector of transistor 604. Thus, the differential output of the delay 302 is coupled to the respective collectors of the differential pair formed by transistors 602 and 604, The outputs may be a write control signal, a write duration control signal, or a write sustain signal, depending on the delay and input signal.

In addition, the example delay illustrated in FIG. 6 includes four additional devices for the purpose of clamping the output voltage of the delay 302 to a predetermined voltage range. In one example, the voltage clamping prevents saturation of the transistors 602 and 604 by clamping their respective collectors to the predetermined voltage range. In the configuration described below, the transistors 614, 616, 618 and 620 clamp the output of the delay device to a voltage range based on the first and second voltage threshold. The output of the delay, $W_{OUTPUT\_X}$ and $W_{OUTPUT\_Y}$, is generated at the collector of transistor 602, 604. In the example of FIG. 6, the transistors 614-620 are illustrated either as NPN or PNP transistors, but a person having ordinary skill in the art will readily appreciate that any active device known in the art, such as a P-channel metal oxide semiconductor field effect transistor ("mosfet"), a N-channel mosfet, or a digital logic device may be used in the example pulse generator 704.

In the configuration illustrated in FIG. 6, transistors 614 and 618 are NPN transistors and transistors 616 and 620 are PNP transistors. The collectors of transistor 614 are 618 are coupled with the voltage source 608. Additionally, the bases of transistors 614 and 616 are both coupled with a first voltage threshold ($V_{T1}$). However, the emitter of transistor 614 is coupled with the collector of transistor 602 and the emitter of transistor 618 is coupled with the collector of transistor 604. The emitters of transistor 616 and 620 are both coupled with a low output signal such as a ground. The bases of transistor 616 and 618 are coupled to a second voltage threshold ($V_{T2}$). The collector of transistor 616 is coupled to the collector of transistor 602 and the collector of transistor 620 is coupled to the collector of transistor 604.

The operation of the example of FIG. 6 is best described in conjunction with the timing diagram illustrated in FIG. 5. As previously described, the input data into the hard drive write system 200 is differential and is therefore complementary (e.g., one input will be a positive voltage and the other input will be a negative voltage). Thus, due to the complementary nature of the differential input into the transistors 602, 604, one of the transistors 602, 604 may be biased to couple the respective collector and emitter of the transistor. For example, when $W_{INPUT\_X}$ applies a positive voltage of at least a predetermined threshold to the base of transistor 602, transistor 602 opens a channel for conduction between the base, collector and emitter such that the current will flow through the emitter of transistor 602.

In this configuration, the current from current source 610 is shunted via the current sink 606 which causes the output, $W_{OUTPUT\_Y}$, to have a low output signal. At the same time, $W_{INPUT\_X}$ will apply a bias to transistor 604 such that the respective collector and emitter of transistor 604 are uncoupled. Consequently, the current from the current source 612 flows to the output, $W_{OUTPUT\_X}$. The voltage of the output ($W_{OUTPUT\_X}$) will be based on the first and second voltage thresholds ($V_{T1}$ and $V_{T2}$). With regards to the reverse operation (e.g., $W_{INPUT\_X}$ has a positive voltage and $W_{INPUT\_Y}$ has a negative voltage), $W_{OUTPUT\_X}$ has a low output signal and $W_{OUTPUT\_Y}$ has an output based on the current source 610 and the first and second voltage thresholds ($V_{T1}$ and $V_{T2}$).

As appreciated by person of ordinary skill in the art, the transistors 602, 604 do not immediately couple their respective collector, base and emitter when a signal is applied to the base of the transistor that causes the transistor to be biased. Rather, there is a brief time delay that is inversely proportional to the current provided to the collector. A person with skill in the art will readily appreciate that the time delay may be described by the following equation:

$$T_{DELAY} = \frac{(V_{T1} - V_{T2}) \times C_P}{A * I_{DELAY} + B^2 * I_{DELAY}}$$

where $V_{T1}$ and $V_{T2}$ are the first and second clamp voltages, $C_P$ is the parasitic capacitance of the devices coupled to the collector of transistors 602, 604, $I_{DELAY}$ is the current of the current sink 606, and both A and B are coefficients. That is, as current decreases, the time to couple the collector and emitter of the transistor 602 and 604 increases non-linearly. Thus, by varying current to the transistors 602, 604, the example delay device may delay the output of the delay devices 302. As described above, the description is above is exemplary for the delay device 302. However, FIG. 6 is also representative of delay devices 304 and 306 which function the same way, albeit different currents (i.e., delays 302 and 306 use different currents in order to have different time delays).

III. Example Signal Generator

Figure 7:
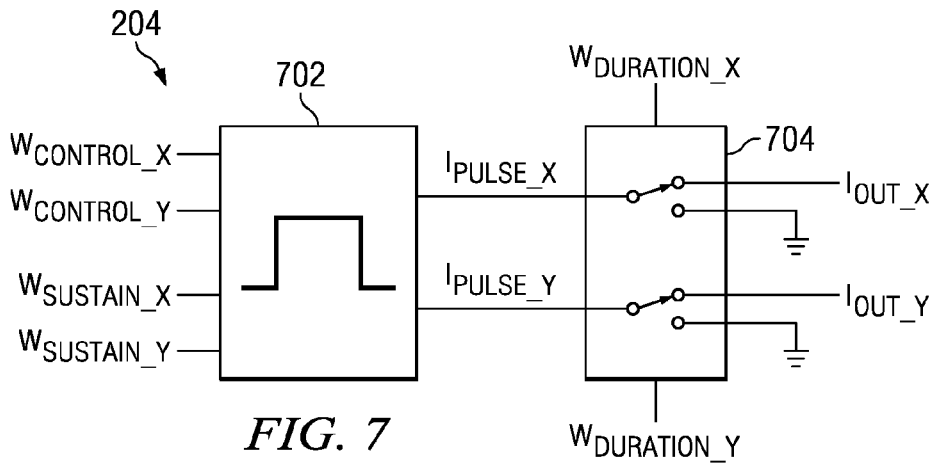
FIG. 7 is a block diagram of an implementation of the example pulse generator of FIG. 2.

FIG. 7 illustrates an example signal generator 204, which may include a pulse generator 702 coupled with a switching device 704. The pulse generator 702 receives a differential control input ($W_{CONTROL\_X}$ and $W_{CONTROL\_Y}$) and a differential sustain input ($W_{SUSTAIN\_X}$ and $W_{SUSTAIN\_Y}$). As previously described, each differential pair is complementary and 180 degrees out of phase. In response to these inputs, the pulse generator 702 produces a differential current pulse ($I_{PULSE\_X}$ and $I_{PULSE\_Y}$) with two current amplitudes (i.e., the overshoot portion and the sustain portion). The switching device 704 receives the current pulse generated by the pulse generator 704. As will be described in detail below, the switching device 704, using a differential biasing input ($W_{DURATION\_X}$ and $W_{DURATION\_Y}$), truncates the output current pulse by shunting the input of the switching device with a low output signal such as a ground.

A. Example Pulse Generator and Switching Device

Figure 8:
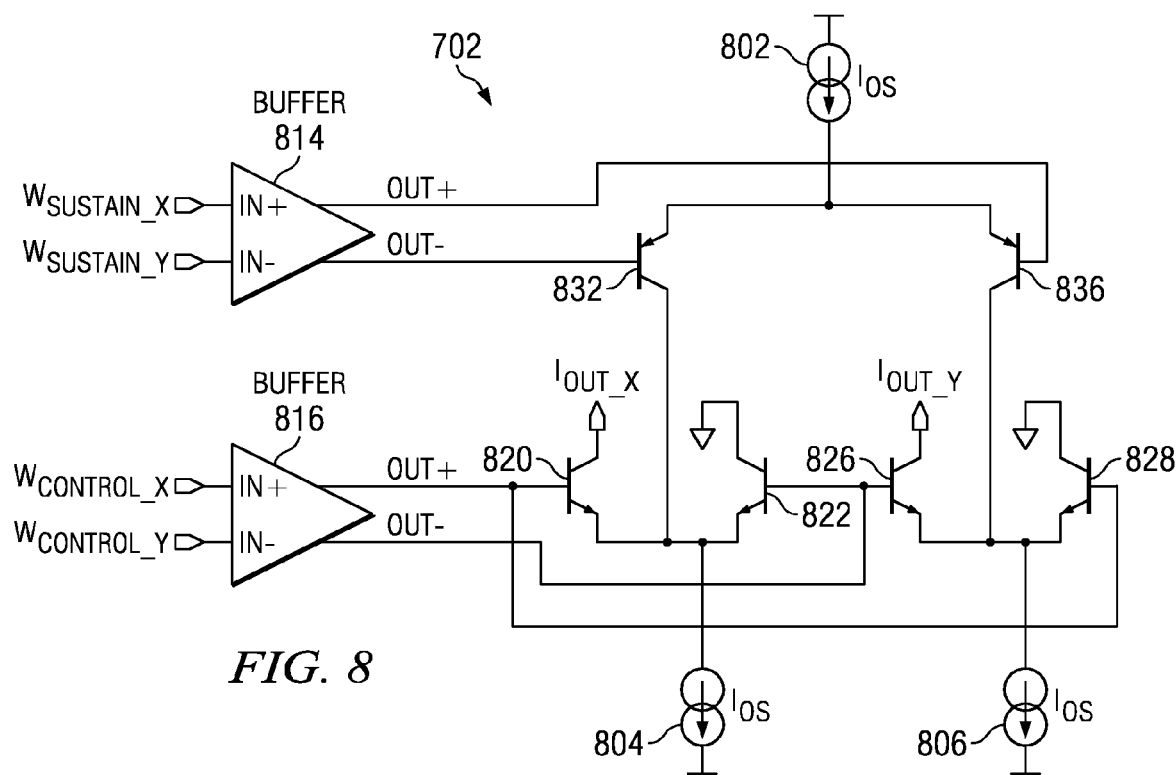
FIG. 8 is a schematic diagram showing additional detail of an example implementation of the signal generator of FIG. 7.

FIG. 8 illustrates a schematic diagram of an example pulse generator 702 that also implements the switching device 704 of FIG. 7. The example pulse generator 704 receives two pairs of differential control signals generated by the pulse former 202 to generate a current pulse on the output ($I_{OUT\_X}$ and $I_{OUT\_Y}$). For the purpose of generating a current pulse, the example pulse generator 702 receives a write control signal ($W_{CONTROL\_X}$ and $W_{CONTROL\_Y}$). In order to stop generating the pulse, a write sustain signal is provided ($W_{SUSTAIN\_X}$ and $W_{SUSTAIN\_Y}$). In the example of FIG. 8, the example pulse generator 704 does not receive a third differential input ($W_{DURATION\_X}$ and $W_{DURATION\_Y}$) as illustrated in FIG. 2. As will be described below in the example FIG. 8, the write control input ($W_{CONTROL\_X}$ and $W_{CONTROL\_Y}$) is received by a differential transistor pair for the purpose of selectively coupling a current source to an output of the pulse generator 704, thus generating a current pulse. Another differential transistor pair receives the write sustain signal ($W_{SUSTAIN\_X}$ and $W_{SUSTAIN\_Y}$) for the purpose of selectively removing the current from the output, thus ending the generation of the current pulse on the output.

1. Description of the Example Pulse Generator

As shown in FIG. 8, the write control signal ($W_{CONTROL\_X}$ and $W_{CONTROL\_Y}$) is received by a buffer 814 and the write sustain signal ($W_{SUSTAIN\_X}$ and $W_{SUSTAIN\_Y}$) is received by a buffer 816. A person having ordinary skill in the art will recognize the buffers 814, 816 condition the input signals in order to properly drive the devices of the pulse generator 704. Additionally, the pulse generator 704 includes transistors 820, 822, 826, 828, 832, and 834. In the example of FIG. 8, the transistors 820-834 are illustrated either as NPN or PNP transistors, but a person having ordinary skill in the art will readily appreciate that any active device known in the art, such as a P-channel mosfet, a N-channel mosfet, or a digital logic device may be used in the example pulse generator 704. Additionally, the transistors 820-834 may have the same rise time (i.e., the time associated between coupling and uncoupling the collector and emitter of the transistor).

Transistors 820 and 824 serve as a differential pair having their respective emitters coupled to a current source 804. Transistors 826 and 828 serve as a differential pair having their respective emitters coupled to a current source 806. The base of transistor 820 and the base of transistor 828 are coupled to $W_{CONTROL\_X}$ via buffer 816. The base of transistor 822 and the base of transistor 826 are coupled to $W_{CONTROL\_Y}$ via buffer 816. The collector of transistor 820 is coupled with the output of signal generator 704 ($I_{OUT\_X}$) and the collector of transistor 822 is coupled with a low output signal such as a ground. The collector of transistor 826 is coupled with the output of signal generator 704 ($I_{OUT\_Y}$) and the collector of transistor 828 is coupled with a low output signal such as a ground.

In the example of FIG. 8, the emitter of transistor 832 and the emitter of transistor 836 are coupled to a current source 802, which sinks a current of $I_{OS}$. Additionally, the base of transistor 832 is coupled to $W_{SUSTAIN\_Y}$ via buffer 814 and the base of transistor 836 is coupled to $W_{SUSTAIN\_X}$ via buffer 814. The collector of transistor 832 is coupled to the emitters of transistors 820 and 822. Furthermore, a current source 804 is coupled to the emitters of transistor 820, the emitter of transistor 822, and the collector of transistor 832. The current source 804 provides a current of $I_{OS\_X}$, which is substantially equal to $I_{OS}$. The collector of transistor 836 is coupled to the emitters of transistors 826 and 828. Furthermore, a current source 806 is coupled to the emitter of transistor 826, the emitter of transistor 828, and the collector of transistor 836. The current source 806 provides a current of $I_{OS\_Y}$, which is substantially equal to $I_{OS}$.

Figure 9:
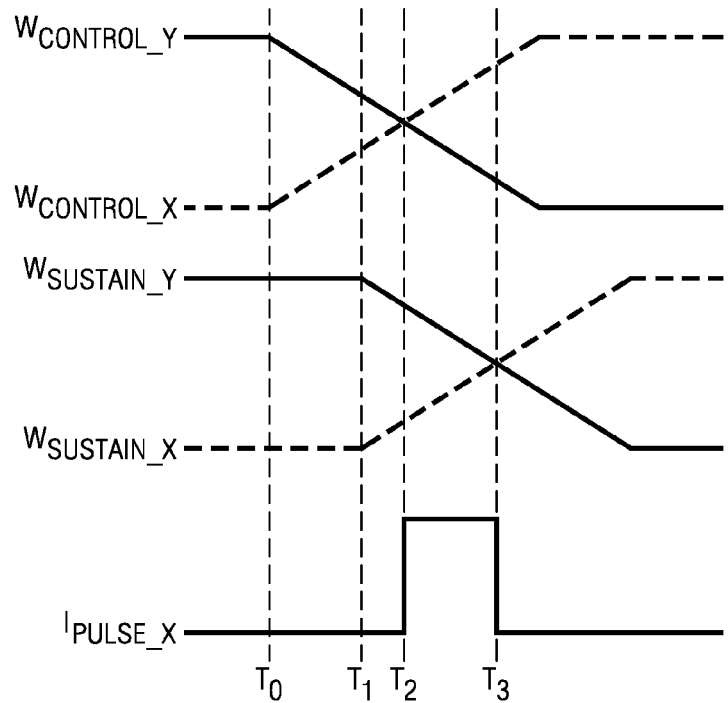
FIG. 9 is a diagram illustrating the pulses formed by the pulse generator of FIGS. 7 and 8.

The operation of the example pulse generator 704 is best described in conjunction with FIG. 9, which illustrates the input and output of the pulse generator 704. Initially, at time $T_0$, the voltage received by the base of transistor 822 is greater than the voltage received by the base of transistor 820, thus the current source 804 ($I_{OS\_X}$) is shunted to the low output signal via transistor 822. In other words, there is no current output of the pulse generator 704 via $I_{OUT\_X}$ at time $T_0$. At the same time, the voltage received by the base of transistor 836 is less than the voltage received by the base of transistor 832, thus, due to the PNP configuration of FIG. 8, the current source 802 ($I_{OS}$) is not coupled to the collector of emitter of transistor 820 and the emitter of transistor 822. Rather, the current source 802 sinks the current from current source 806 via transistor 836. In other words, the current source 806 is not coupled with the emitter of transistor 826. Accordingly, at time $T_0$, the signal generator does not generates a current pulse via the output, $I_{OUT\_X}$.

In the example of FIG. 9, at time $T_2$, the voltage received by the base of transistor 822 ($W_{CONTROL\_Y}$) is reduced and less than voltage received by the base of transistor 820 ($W_{CONTROL\_X}$). As a result, transistor 820 couples the output ($I_{OUT\_X}$) with the current source 804 at time $T_2$, thus generating a current pulse substantially equal to $I_{OS}$ via the output, $I_{OUT\_X}$. Additionally, the voltage received by the base of transistor 832 is greater than the base voltage of transistor 834, thus transistor 832 does not couple its respective collector and emitter. In other words, the current source 802 is not coupled with the emitter of transistor 820. Accordingly, at time $T_2$, the pulse generator 704 generates a current pulse via the output, $I_{OUT\_X}$.

At time $T_3$, the transistors 822 and 820 have not changed since time $T_1$ and the output ($I_{OUT\_X}$) remains coupled with the current source 804. However, the voltage received by the base of transistor 832 is reduced to less than the voltage received by the base of transistor 834, which thus removes the coupling between current source 806 and current source 802 and instead couples current source 804 with current source 802. In other words, the current source 802 steals the current from current source 804 and transistor 820 and causes the pulse generator 704 to stop generating a current output via $I_{OUT\_X}$. Thus, at time T3, the signal generator stops generating a current pulse via $I_{OUT\_X}$ when $W_{SUSTAIN\_X}$ causes the current source 802 to steal the current.

The operation of the example pulse generator 704 thus operates by selectively coupling the current sources 804 with the output of the signal generator ($I_{OUT\_X}$) when the control signal ($W_{CONTROL\_X}$) rises. However, when the sustain signal ($W_{SUSTAIN\_X}$) rises, the current provided by current source 804 is stolen by the current source 802, thus ending the current generated on the output ($I_{OUT\_X}$). That is, a current is generated on the output of the pulse generator 704 when $W_{CONTROL\_X}$ rises and stops generating the current when $W_{SUSTAIN\_X}$ rises. With respect to the output $I_{OUT\_Y}$, as previously discussed, the control inputs and sustain inputs are differential and 180 degrees out of phase, thus the same operation would occur with respect to the second output, $I_{OUT\_Y}$.

B. Second Example Pulse Generator

Referring back to FIG. 7, a second example pulse generator 704 will be described. In the second example, the pulse generator 702 produces a consolidated pulse with two current amplitudes (the overshoot portion and the sustain portion). The write control signals ($W_{CONTROL\_X}$ and $W_{CONTROL\_Y}$) cause the pulse generator 702 to produce a current pulse on the outputs ($I_{PULSE\_X}$ and $I_{PULSE\_Y}$) with a first pulse amplitude substantially equal to a current overshoot. The write sustain signals ($W_{SUSTAIN\_X}$ and $W_{SUSTAIN\_Y}$) are precisely timed to lag the write control signals ($W_{CONTROL\_X}$ and $W_{CONTROL\_Y}$) in order to produce the sustain portion of the consolidated current pulse. In other words, the write sustain signals cause the pulse generator 702 to reduce the current of the current pulse for the duration of the control inputs ($W_{CONTROL\_X}$ and $W_{CONTROL\_Y}$).

The pulse generator 702 thus generates current pulses that are conveyed to the switching device 704 via $I_{PULSE\_X}$ and $I_{PULSE\_Y}$. The switching device 704 also receives the write duration signals ($W_{DURATION\_X}$ and $W_{DURATION\_Y}$) as biasing inputs in order to selectively couple the pulse generator 702 to the outputs of the switching device 704 ($I_{OUT\_X}$ and $I_{OUT\_Y}$). Alternatively, the biasing inputs may also selectively couple the pulse generator 702 with a low output signal such as a ground. In one example, the biasing inputs ($W_{DURATION\_X}$ and $W_{DURATION\_Y}$) may bias the switching device 704 to convey a portion of the consolidated current pulse to the driver device 206 and a portion of the consolidated current pulse to the low output signal, thereby truncating the duration of the consolidated current pulse generated by the pulse generator 702.

1. Example Pulse Generator

Figure 10:
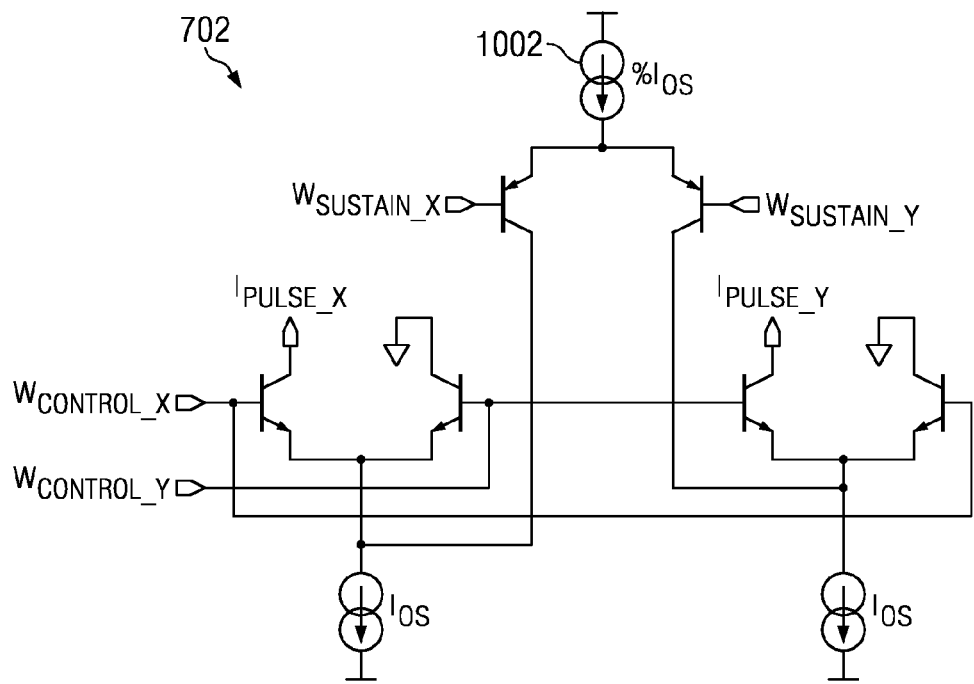
FIG. 10 is a schematic diagram showing additional detail of a second example implementation of the pulse generator of FIG. 7.

A second example pulse generator 702 is shown in FIG. 10. The example of FIG. 10 is a pulse generator 704 similar to the first example of FIG. 8. However, a current sink 1002 is provided to shunt a portion of the current provided by current sources 804 and 806 (i.e., current sink 1002 sinks a percentage of $I_{OS}$). In other words, the example of FIG. 10 functions as described in conjunction with the first example of FIG. 8. However, because the example of FIG. 10 does not shunt the entire current from current sources 804 and 806 via the current sink 1002, the pulse generator 702 does not end the generation of the pulse. Instead, the pulse generator 702 steals a portion of the current, thus reducing the current of the pulse rather than ending generation of the current pulse. In other words, the second example pulse generator 702 produces a consolidated pulse having a first overshoot current and a second sustain current.

i. Operation of the Signal Generator

Figure 11:
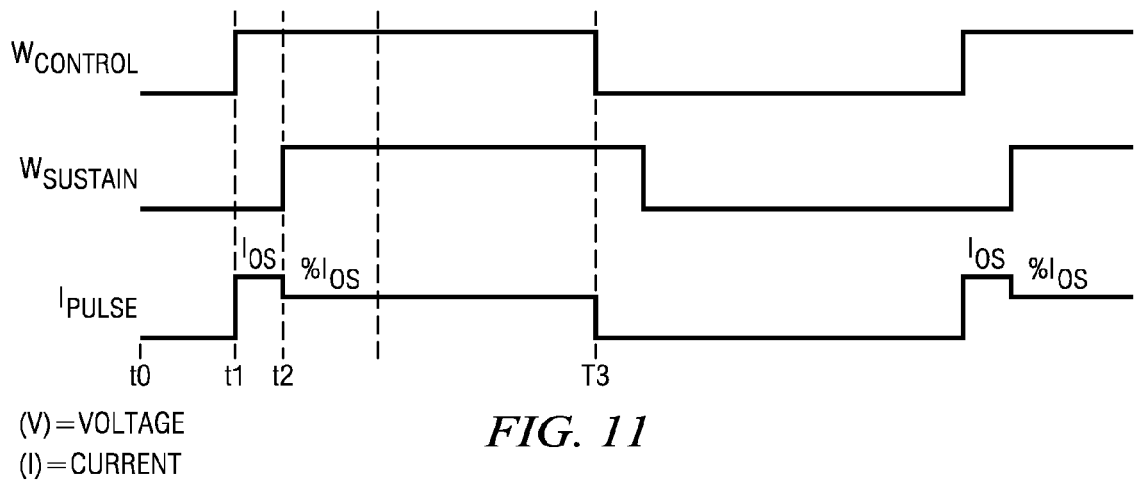
FIG. 11 is a diagram illustrating example pulses formed by the example pulse generator of FIG. 10.

The current pulse generated by the example pulse generator 702 of FIG. 10 is best described in reference to the timing diagram exhibited in FIG. 11. FIG. 11 illustrates the timing diagram of the pulse generator 702 with the output of the pulse generator 702 illustrated as $I_{PULSE}$. A person having ordinary skill in the art will readily appreciate that the pulse generator 704 is a differential system and that FIG. 11 does not illustrate the complementary inputs and outputs of the differential pulse generator 704.

As described above, on the rising edge of the write control signal ($W_{CONTROL\_X}$ or $W_{CONTROL\_Y}$) at time $T_1$, the pulse generator 702 generates a current via the associated output ($I_{PULSE\_X}$ or $I_{PULSE\_Y}$). The current of the pulse is substantially equal to an overshoot value, $I_{OS}$. On the rising edge of the sustain input ($W_{SUSTAIN\_X}$ or $W_{SUSTAIN\_Y}$) at time T2, as described above, the pulse generator 702 reduces the output current ($I_{PULSE\_X}$ or $I_{PULSE\_Y}$) to a portion of $I_{OS}$. In the example of FIG. 11, when the control input ($W_{CONTROL\_X}$ or $W_{CONTROL\_Y}$) falls at time T3, the pulse generator 702 stops generating current on the output ($I_{PULSE\_X}$ or $I_{PULSE\_Y}$). In other words, a current pulse with an overshoot current amplitude is generated on the output ($I_{PULSE\_X}$ or $I_{PULSE\_Y}$) which has substantially the same pulse duration of the control input ($W_{CONTROL\_X}$ or $W_{CONTROL\_Y}$), but the amplitude is reduced when the sustain input ($W_{SUSTAIN\_X}$ or $W_{SUSTAIN\_Y}$) removes a portion of the current. Thus, the pulse created by the pulse generator 702 is a consolidated overshoot and sustain pulse.

2. Example Switching Device

Figure 12:
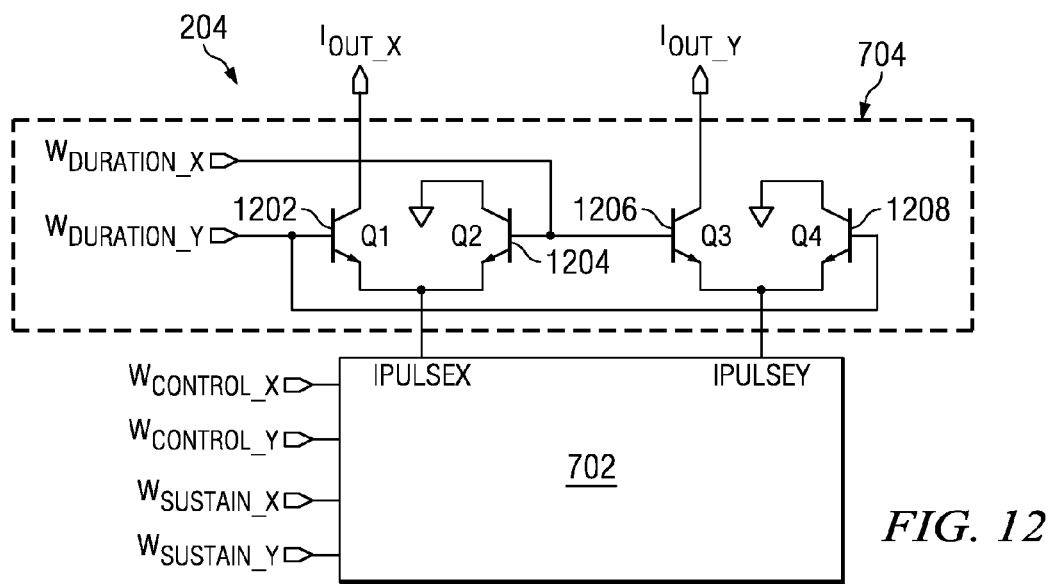
FIG. 12 is a schematic diagram showing additional detail of the switching device of FIG. 7 in combination with a pulse generator.

Referring back to FIG. 7, a switching device 704 is coupled with the pulse generator 704. The switching device 704 receives a current pulse via a differential input ($I_{PULSE\_X}$ or $I_{PULSE\_Y}$). Using a biasing input, the switching device selectively couples the input with either the driver 206 (i.e., $I_{OUT\_X}$ and $I_{OUT\_Y}$) or a low input signal such as a ground. As illustrated in example of FIG. 7, the biasing input ($W_{DURATION\_X}$ or $W_{DURATION\_Y}$) controls the duration of the current pulse conveyed to the driver 206. FIG. 12 illustrates a schematic for an example switching device 704. A person having ordinary skill in the art will readily appreciate that the switching device 704 is a differential system, and accordingly only one of the differential operation will be described because the second differential operation is identical to the first, albeit 180 degrees out of phase.

The example pulse generator in FIG. 12 depicts a first pulse generator, such as a pulse generator illustrated in FIG. 10. The pulse generator is coupled with the switching device 704. The switching device 704 consists of four switching devices: NPN bipolar transistors 1202, 1204, 1206 and 1208. However, the switching devices may be of any type of device known in the art that can be configured to control the switching device 704 via biasing inputs. For example, the switching devices may be PNP or NPN bipolar transistors, heterojunction bipolar transistors, P-channel or N-channel field effect transistors, or digital logic gates.

As shown in the example of FIG. 12, the emitter of both transistors 1202 and transistor 1204 are coupled to the differential input of the switching device, $I_{PULSE\_X}$ and $I_{PULSE\_X}$, respectively. The base of transistor 1202 is coupled to $W_{DURATION\_Y}$ and the base of transistor 1204 is coupled to the biasing input, $W_{DURATION\_X}$. The collector of transistor 1202 is coupled to $I_{OUT\_X}$ and the collector of transistor 1204 is coupled to a low output signal (e.g., a ground, a system ground, etc). Additionally, the emitter of transistor 1206 and the emitter of transistor 1208 are coupled to $I_{PULSE\_Y}$. The base of transistor 1206 is coupled to $W_{DURATION\_X}$ and the base of transistor 1208 is coupled to $W_{DURATION\_Y}$. The collector of transistor 1206 is coupled to $I_{OUT\_Y}$ and the collector of transistor 1208 is coupled to a low output signal (e.g., a ground, a system ground, etc).

As previously described, the biasing inputs of switching device 704 ($W_{DURATION\_X}$ and $W_{DURATION\_Y}$) is the differential write duration control signal generated by pulse former device 202. Thus, $W_{DURATION\_X}$ and $W_{DURATION\_Y}$ are complementary and 180 degrees out of phase. The biasing inputs applied to the bases of the transistors 1202, 1204, 1206, and 1208 via $W_{DURATION\_X}$ and $W_{DURATION\_Y}$ may bias the transistors such that the transistors 1202-1208 couple their respective collector and emitter, thus conducting signals between their respective collector and emitter. A person having ordinary skill in the art will appreciate that the illustrative example is just one of many configurations that can achieve the result described herein.

Figure 13:
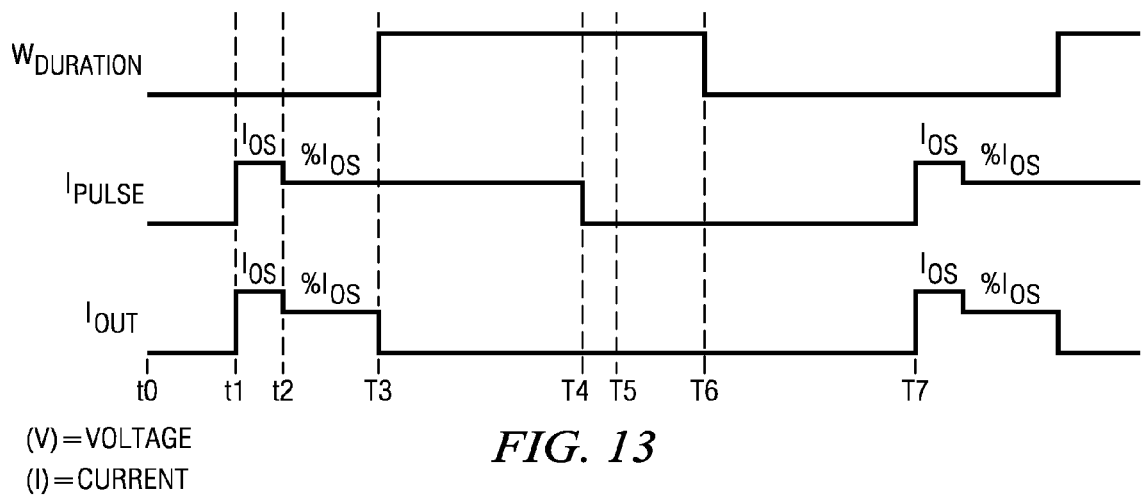
FIG. 13 is a diagram illustrating example pulses formed by the switching device of FIG. 12 in combination with a pulse generator.

Turning now the operation of transistor 1202 and 1204, the emitters of both transistors are both coupled to $I_{PULSE\_X}$ and are best explained in operation together in reference to FIG. 13. Presuming that $W_{DURATION}$ shown in FIG. 13 is representative of $W_{DURATION\_X}$, and then at time $T_0$, $W_{DURATION\_Y}$ has a positive voltage because it is inversely related to $W_{DURATION\_X}$. $W_{DURATION\_Y}$ thus applies a voltage to the base of transistor 1202 to bias the transistor 1202. As a result of the biasing applied to transistor 1202, a channel for conduction between the collector and emitter of transistor 1202 is opened and thus couples $I_{PULSE\_X}$ with $I_{OUT\_X}$. Thus, as illustrated in FIG. 13, signals may be may be conveyed to $I_{OUT\_X}$ via $I_{PULSE\_X}$. Now turning to transistor 1204, the voltage applied to base of transistor 1204 via $W_{DURATION\_X}$ does not bias the transistor, and thus the transistor 1204 prevents conduction between the emitter and collector.

Now turning to time $T_3$, due to the complementary nature of the differential biasing inputs, $W_{DURATION\_Y}$ falls and $W_{DURATION\_X}$ rises. That is, $W_{DURATION\_X}$ applies a biasing voltage to transistor 1204 to couple the emitter and collector of transistor 1204. At the same time, $W_{DURATION\_Y}$ applies a voltage to the transistor 1202 that does not bias the transistor 1202. In other words, the transistor 1204 couples $I_{PULSE\_X}$ with a low output signal such as a ground, which shunts any current to the low output signal after time T3. As illustrated in FIG. 13, the current pulse associated with $I_{OUT\_X}$ is truncated based on the write duration control signal. The operation of transistors 1202 and 1204 can be summarized by the following: when $W_{DURATION\_Y}$ biases transistor 1202, $I_{OUT\_X}$ is coupled to $I_{PULSE\_X}$, and thus the signal generator 204 is coupled with the driver 206. Likewise, when $W_{DURATION\_X}$ is not biased, the $I_{PULSE\_X}$ output of the signal generator 204 is coupled to a low output signal.

As previously described, the switch accepts differential control signals that are 180 degrees out of phase. A person having ordinary skill in the art will readily appreciate that the operation of the transistor 1206 and 1208 pair works identical to the transistor 1202 and 1204 pair except the output of the pair is either $I_{OUT\_Y}$ or a low output signal such as a ground.

Additionally, the $I_{PULSE\_Y}$ may be coupled $I_{OUT\_Y}$ such that the differential output of switching device 804 ($I_{OUT\_X}$ and $I_{OUT\_Y}$) are 180 degrees out of phase with each other.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of temperature compensation in a hard disk write system, the method comprising:
    forming a first delayed signal based on the temperature of the hard disk write system, wherein the first delay is formed based on a first temperature coefficient;
    forming a second delayed signal based on the temperature of the hard disk write system, wherein the second delay is formed based on a second temperature coefficient; and
    forming a current pulse based on the first and second delay signal.

2. A method as defined in claim 1, wherein the first and second temperature coefficient are complementary.

3. A method as defined in claim 1, wherein a difference between the first and second delayed signal is substantially linear based on the temperature of the hard disk write system.

4. A method as defined in claim 1, further comprising altering a first current source based on temperature to create the first delay.

5. A method as defined in claim 4, wherein the current of the first current source is a base current subtracted by the temperature coefficient.

6. A method as defined in claim 1, further comprising altering a second current source based on temperature to create the second delay.

7. A method as defined in claim 6, wherein the current of the second current source is a base current added to the temperature coefficient.

8. A method as defined in claim 1, wherein the current pulse is formed based on the first delayed signal.

9. A method as defined in claim 8, wherein the current pulse has an amplitude of a predetermined value.

10. A method as defined in claim 8, wherein the amplitude of the current pulse is reduced based on the second delayed signal.

11. A method as defined in claim 10, wherein the current pulse having an amplitude of a predetermined value with a duration based on the first and second delayed signal.

12. A method as defined in claim 11, wherein the current pulse having an amplitude of a predetermined value with a duration that is substantially linear based on the temperature of the hard disk write system.

13. A method as defined in claim 1, wherein duration of the current pulse is substantially constant when the pulse is received by a write head.

14. An apparatus for temperature compensation for hard disk write system, the apparatus comprising:
    a first delay device to form a first delay signal based on the temperature of the hard disk write system;
    a second delay device to form a second delay signal based on the temperature of the hard disk write system; and
    a pulse generator to generate a current pulse based on the first and second delay,
    wherein a time duration between the first delayed signal and the second delay signal is proportional to the temperature of hard disk drive.

15. An apparatus as defined in claim 14, further comprising a first current source, wherein the first current source alters current to the first delay device to create the first delay.

16. An apparatus as defined in claim 15, wherein the first current source is substantially equal to a base current minus a temperature coefficient.

17. An apparatus as defined in claim 14, further comprising a second current source, wherein the second current source alters current to the second delay device to create the second delay.

18. An apparatus as defined in claim 17, wherein the second current source is substantially equal to a base current plus a temperature coefficient.

19. An apparatus as defined in claim 14, wherein duration of the current pulse is substantially constant when the pulse is received by a write head.

20. A hard disk write system in a hard drive, the system comprising:
a pulse forming device to form a first and second delay signal,
a signal generator to form a current pulse based on the first and second delay signals,
a driver to convey the current pulse to a hard drive write head,
wherein a time duration between the first and second delayed signal is proportional to temperature.

21. A hard disk write system as defined in claim 20, wherein the first delay is based on a temperature of the hard drive write system.

22. A hard disk write system as defined in claim 20, wherein the second delay is based on a temperature of the hard drive write system.

23. A hard disk write system as defined in claim 20, wherein the current pulse has a first current amplitude substantially equal to a predetermined value and a second current amplitude set to a portion of the predetermined value.

24. A hard disk write system as defined in claim 23, wherein the duration the current pulse has the first current amplitude is based on the first and second delay signals.

25. A hard disk write system as defined in claim 20, wherein duration of the current pulse is substantially constant when the pulse is received by a write head.

* * * * *